Patented Sept. 21, 1954

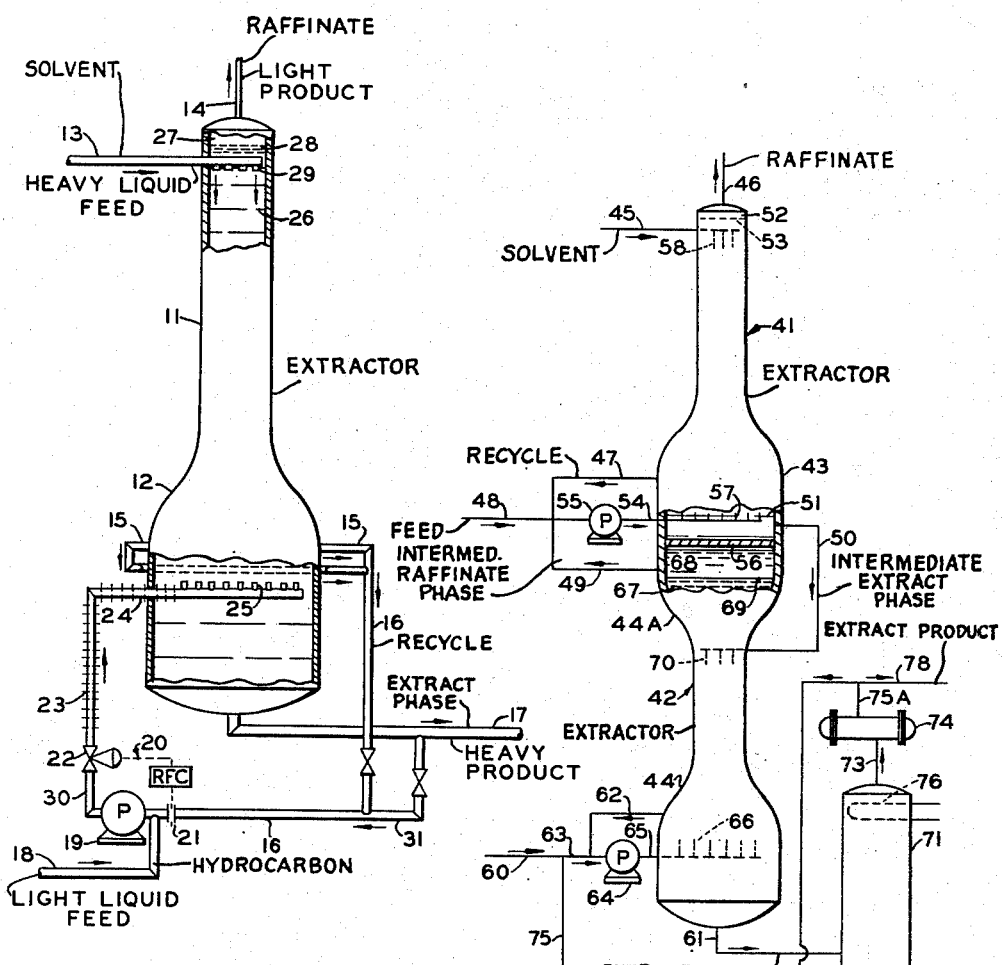

2,689,874

UNITED STATES PATENT OFFICE 2,689,874

LIQUID-LIQUID SOLVENT EXTRACTION

Robert A. Findlay, Bartlesville, Okla., assignor to Phillips Petroleum Company, a corporation of Delaware Application September 29, 1950, Serial No. 187,599

10 Claims. (Cl. 260—666)

This invention relates to liquid-liquid contacting operations. In one aspect, it relates to a method for obtaining efficient contacting between two immiscible or partially miscible liquids. In another aspect, it relates to a solvent extraction operation wherein a liquid charge stock is efficiently contacted with an extraction solvent.

One of the problems of the prior art in carrying out operations wherein two or more immiscible or partially miscible liquids are to be contacted is to obtain intimate contacting between the several liquid phases. This problem is especially difficult in case the liquids involved are relatively viscous. Examples of relatively viscous liquids frequently contacted in chemical operations are lubricating oil stocks and heavy heating oil stocks, while examples of treating agents which are viscous include such materials as strong sulfuric acid, the ethanol amines, the glycols, aniline, etc. Prior art has employed many different types of liquid-liquid contacting apparatus and methods or processes involving use of such apparatus, especially in countercurrent liquid-liquid contacting operation. Sometimes unpacked columns are used, but for the most part some type of contacting device is used. Devices frequently used are bubble cap-tray assemblies, baffles, or such packing material as broken bricks, glass or manufactured packing materials such as Raschig rings and the like.

In many instances at least some degree of mixing may be obtained by injecting one component through a small orifice or a jet into a body of another component. A common apparatus for use in mixing doctor treating solutions with oils containing mercaptan sulfur compounds includes a series of orifices mounted at spaced intervals in a pipe. Such apparatus is sometimes called orifice mixers or incorporators. When such an apparatus is used, the doctor treating solution and the oil are injected into one end of such an orifice mixer by a single pump, or the two streams may be manifolded into one end of the mixer. When the two liquids pass through one of the small orifices, agitation and mixing occurs. A little time for contacting occurs between the time the liquids pass through the first orifice and a second orifice. Centrifugal pumps of various designs have been used to effect mixing of immiscible liquids. One advantage of the latter apparatus as a mixer is that contacting of the several liquids is intimate. One disadvantage is that the contacting is of relatively short duration. Various combinations of mixing devices have been proposed to solve specific mixing problems, but where intimate contact between two liquid phases is to be maintained over a relatively long period of time the heretofore mentioned mixing devices have been found to be none too efficient.

I have found a method wherein certain apparatus will give very intimate contacting and this intimate contacting can be maintained over a relatively long period of time.

Specifically, my invention involves the use of a pump, with or without an orifice mixing device, in combination with a more or less conventional liquid-liquid extraction column which solves the liquid-liquid contacting problem.

The use of jets in obtaining contacting of one liquid with another has been proposed in the prior art, but several objections to the use of jets are invariably present. One objection is that since jets, to be efficient, must have very small diameters, for example 1/8 inch or less. Such small diameter jets can pass only small volumes of liquid, and, accordingly, in order to obtain the volume required for commercial operations, a relatively large number of jets have to be used. A second disadvantage in the use of jets is the ease with which the small diameter jets become plugged. Jets of 1/8 inch and less in diameter become plugged with scale, sediment and other solid material which frequently is mechanically carried by a liquid in process. Of course, jets which become plugged lose utility in any mixing operation until they are freed from the plugging material. A few jets upon becoming plugged merely slow down the rate of the treating operation while when an appreciable proportion of the jets become plugged the operation may need be terminated until the jets are cleaned.

The above mentioned jets or inlet tubes of small diameter are sometimes used for introducing one liquid to be treated into another liquid. Due to the high viscosities of some liquids, it is difficult to obtain a fine degree of dispersion of one liquid through a jet or nozzle into another liquid. Some degree of dispersion can be obtained when relatively large pressure drops are maintained across the jets. Of course, high pressure drops involve use of power and, accordingly, cost of operation is increased.

Agitators, such as propellers and the like, have been used in an attempt to obtain efficient mixing. While such apparatus has been satisfactory in many operations, power requirements for their operation are usually high.

My method for obtaining efficient contacting of two liquids involves forming a dispersion of relatively fine droplets of one liquid within a second liquid in, for example, a centrifugal pump, and injecting this dispersion into a countercurrent liquid-liquid extraction column in which the above-mentioned second liquid is the continuous phase in the extraction column. When these conditions are met and such a dispersion is injected into a treating column, the concentration of the dispersed liquid droplets is reduced by dilution with additional liquid from the treating column and the dispersed droplets remain as such, under which conditions very efficient liquid-liquid contacting between the dispersed droplets and the continuous phase is obtained.

In the drawing, Figure 1 is a diagrammatic representation of one form of apparatus for carrying out the process of my invention. Figure 2 is a second embodiment of apparatus which may be used in carrying out the process of my invention.

The apparatus illustrated in Figure 1 consists essentially of a liquid-liquid extraction tower 11 with suitable pipe connections for inlet and outlet of the several liquid materials to be treated and products to be removed. In the embodiment shown in Figure 1, the lower end of column 11 is an enlarged section 12 so that settling may be more efficiently effected. A line 14 is connected to the top of the column for removal of top column product. A line 13 enters the column at a point a short distance below the top for inlet of a liquid extractant material. One or more outlets 15 are provided in the upper end of the enlarged section 12. These connections are for withdrawal of liquid material in process. The portion of pipe 24 within the enlarged section 12 is provided with a number of vertically arranged outlet pipes 25. These outlets 25 may merely be pipe nipples teed or manifolded into the main inlet pipe 24 so as to distribute material over a substantial cross-sectional area of the column at this point. A pipe 17 is provided at the bottom of the column for removal of product from this point. The outlet pipes 15 are connected with a pipe 16, and this pipe 16 leads to the inlet side of a centrifugal pump 19. Pipe 30 is connected to the outlet side of this centrifugal pump and it carries a motor valve 22, which in turn is connected with an orifice mixer 23. This orifice mixer is connected to the above-mentioned inlet pipe 24. An orifice 21 is provided in pipe 16 as shown. This orifice 21 and the motor valve 22 are component parts of a rate of flow controller apparatus which is identified by reference numeral 20. Pipe 18 is connected to pipe 16 between orifice 21 and the pump 19 for introduction of feed stock material.

In the upper portion of column 11, some nozzles or pipe nipples 29 are provided on the inlet end of feed pipe 13 so that liquid material introduced through pipe 13 may be distributed throughout the cross-sectional area of the vessel at this point.

In the operation of my invention, using the apparatus illustrated in Figure 1, an extractant liquid material, such as furfural, is fed into the column through line 13 until the column has been entirely filled or filled to a level in the column identified by reference numeral 28. When the column has been filled with extractant liquid, the centrifugal pump 19 is set into operation and extractant liquid is withdrawn through pipes 15 and through pipes 16 into the pump. Pump discharge then flows through pipe 30, motor valve 22, orifice mixer 23, pipe 24 and inlets 25 into the body of liquid at a point slightly below the point of outlet of this liquid. When pump 19 has been operating for a sufficient period of time that circulation of liquid is uniform, some liquid may then be withdrawn through line 17. During this initial period of operation, the liquid removed by way of line 17 may be by-passed directly into line 31 and reintroduced into the tower. Liquid material to be extracted, from a source not shown, is passed through line 18 into line 16. The two liquids enter the suction side of pump 19 and therein agitation or mixing is extremely vigorous. If desired, a high speed centrifugal pump may be employed to effect intimate contacting. A sample of pump discharge indicates that a very fine dispersion of hydrocarbon in solvent is formed. This material then passes on through valve 22 and into the orifice mixer 23. Since considerable agitation is effected in mixer 23, there is little opportunity for the dispersed liquid droplets to coalesce into larger droplets. It is intended that the ratio of the liquid entering pump 19 from line 18 to that from line 16 be maintained such that the extractant liquid is the continuous phase of the dispersion. Under this condition, when the dispersion is introduced into the tower through the inlets 25 the very fine droplets are then dispersed in a larger volume of the continuous phase. Since the droplets are lighter specifically than the continuous phase, they rise in the tower in countercurrent flow to the downwardly flowing heavy extractant liquid. Some of this dispersion will be removed through the outlet lines 15 and will pass on through line 16 to meet an additional quantity of charge stock from line 18 and the mixture is then mixed in pump 19. This recirculation of a portion of the material from the region of the outlet pipes 15 markedly improves the degree of dispersion of the hydrocarbons being treated as compared with introducing fresh feed alone through inlets 25. In this method of operation, the extremely fine droplets of liquid hydrocarbon slowly ascend through the downward flowing column of extractant liquid and by the time the hydrocarbon droplets reach the upper portion of the vessel 11 the extraction operation is substantially complete. Reference numeral 27 is intended to identify a hydrocarbon liquid phase floating on the surface of the heavier extractant liquid phase 26. These two liquids meet at a common liquid-liquid interface 28. This treated or contacted hydrocarbon 27 is termed raffinate and some raffinate is maintained in the top of the tower so that none of the extractant liquid will be withdrawn with this raffinate material through line 14.

The inlets 25 are disposed at some distance above the base of the column so that a quiescent settling zone below these inlets will afford ample opportunity for all dispersed hydrocarbon material to rise so that none will be withdrawn with the extractant liquid through line 17. The product withdrawn through line 17 is ordinarily termed the extract phase. This extract phase contains the extraction solvent and all materials dissolved from the feed stock. The raffinate phase removed from the top of the column through line 14 ordinarily contains some extractant liquid in solution.

The rate of flow controller apparatus 20 is provided so that a definite recycle rate may be obtained according to optimum conditions of operation. The recycle rate of material through line 16 will be dependent upon the kind of feed stock and the extractant liquid charged to the system. For example, when the extractant liquid is furfural containing three per cent of water and the hydrocarbon feed stock is a mixture of cyclohexane and normal heptane, the ratio of the recycle material through line 16 to the feed stock entering through line 18 may be varied between the limits of 3:1 to 5:1 (parts by weight). It will be obvious that when other charge stocks and other extractant liquids are used that these recycle ratios may be different. In this particular case, it was found that when the ratio of recycle to feed stock was greater than 5:1 the resulting dispersion required too long a time to separate. When the ratio was less than 3:1, poor dispersion of the hydrocarbon resulted. Pump speed appeared to have little effect on the degree of mixing of the feed and recycle components. As mentioned, in this particular system the furfural was the continuous phase and the hydrocarbon feed stock was the dispersed phase.

Table I shows the operation data illustrating the efficiency of contacting of the method of my invention when using a two-inch diameter column, three feet in height.

TABLE I

*2-inch diameter column—effective height three feet*

System: Furfural+3 per cent water-cyclohexane-n-heptane at 86° F.
Pump: Model D11 Eastern centrifugal turning at 3,450 R. P. M.

| Run No. | Furfural Rate, lbs./hr. | Flow Ratio, lbs. furfural/lb. hydrocarbon | No. of Theoretical Stages | lbs. Recycle Extract/lb. hydrocarbon |
|---|---|---|---|---|
| 1 | 68.1 | 10.3 | 1.2 | 3.0 |
| 2 | 108 | 11.2 | 1.2 | 3.0 |
| 3 | 122 | 10.1 | 1.2 | 3.0 |
| 4 | 165 | 10.6 | 1.5 | 3.0 |

TABLE II

*2-inch diameter column—effective height 8.5 feet*

| Run No. | Furfural Rate, lbs./hr. | Flow Ratio, lbs. furfural/lb. hydrocarbon | No. of Theoretical Stages | lbs. Recycle Extract/lb. hydrocarbon |
|---|---|---|---|---|
| 5 | 73.5 | 11.5 | 2.5 | 4.0 |
| 6 | 114 | 11.9 | 3.7 | 4.0 |
| 7 | 130 | 10.8 | 4.1 | 4.0 |
| 8 | 156.0 | 10.0 | 4.0 | 4.0 |

In Table II is given the operating data of the operation according to my invention when using the above-mentioned column of two-inch diameter and 8½ feet high.

The apparatus shown in Figure 2 is illustrative of an operation in which an extraction and stripping steps are employed. The two sections may be disposed one above the other as illustrated in the drawing, or one step may be carried out in a vessel along the side of the vessel in which the other step is carried out. Each of the apparatus portions of Figure 2 are more or less similar to those of Figure 1. The upper portion of the apparatus is a liquid-liquid contacting vessel 41 which is provided with a feed line 45, a top product withdrawal line 46 and several bottom withdrawal lines. One of these latter lines is identified by reference numberal 50 and this line is connected to the bottom of the upper vessel section 41 at a point which is above an impervious separator 56. This line 50 leads into the lower vessel 42 at a point just below the enlarged section 44A and terminates in several outlets 70. An outlet pipe 47 is attached to vessel 41 at a point well above the attachment of line 50 and this line 47 leads to line 48 which is attached to the inlet side of a centrifugal pump 55. The discharge side of the centrifugal pump is connected by way of pipe 54 to the bottom portion of vessel 41. This bottom and enlarged portion of vessel 41 is identified by reference numeral 43. This point in section 43 into which pipe 54 leads is between the connections of pipes 47 and 50 so that material introduced into the vessel through pipe 54 will enter the vessel at some point between the inlet points of pipe 47 and pipe 50. On the inner end of pipe 54 are some vertically arranged outlets 57 which may be pipe nipples or the like teed or manifolded to pipe 54. On the inner end of pipe 45 are provided some outlets 58 more or less similar to outlets 57. These outlets 58 may also be pipe nipples teed or manifolded to pipe 45.

The lower portion of the apparatus of Figure 2 includes the treating vessel 42 to the bottom of which is attached an enlarged section 44 and to the top of which is attached an enlarged section 44A. This enlarged section 44A is actually an extension of the upper enlarged section 43 and is intended to include the volume of this section below the separator or partition 56. To this enlarged section 44A is attached a pipe 49 which leads into pipe 48 on a suction side of the pump 55. Pipe 50 is connected with section 43 as above stated. To the lower enlarged section 44 is attached an outlet pipe 62 which leads to pipe 63 which, in turn, is attached to the suction side of the centrifugal pump 64. Pipe 65 leads from the discharge side of this pump into the column section 44. Pipe 65 terminates in pipe nipples or other openings 66 which may be similar to elements 57, 58 and 70. Pipe 61 leads from the bottom of section 44 into about the center or midsection of a distillation column 71. This column is provided with a reflux coil 76, a reboiler coil 77, a bottoms drawoff line 72 and an overhead vapor line 73. This latter line contains a condenser 74 which is connected to pipe 75A which in turn leads via lines 75 and 63 to the suction side of the pump 64.

In the operation of my invention when using the apparatus illustrated in Figure 2 an extractant liquid such as furfural which may contain some water is introduced into the apparatus through line 45. Sufficient extractant is added through this line to fill all of the main section 42 up to the level indicated by reference numeral 69, and all of the upper section 41 of the tower up to the point indicated by the reference numeral 53. When the apparatus is so filled with extractant, pump 55 may be started in order to circulate extractant from the enlarged section 43 through pipes 47, 48 and through pipe 54 back into the enlarged section 43. Likewise, extractant may be permitted to flow through pipe 50 from the upper treating zone to the lower treating zone. In like manner, pump 64 may be started to circulate extractant from the upper portion of the enlarged section 44 through pipes 62, 63 and 65 into the mid-portion of section 44. If desired, some of the extractant may be withdrawn through bottoms draw-off line 61 into the fractionator 71. When all of these operational steps are properly "lined out" including the starting up of the distillation column 71, some feed stock, for example, a cyclohexane-normal heptane feed mixture, is introduced, from a source not shown, through pipe 48 into the suction side of the centrifugal pump 55. At this point, this feed stock is violently mixed with extractant from pipe 47 and the mixture which is a very intimate mixture of hydrocarbon in extractant passes through line 54 and outlets 57 into the enlarged section 43. Fine droplets of hydrocarbon then, due to their lower specific gravity than that of the furfural, pass upward in countercurrent relation to the downward flowing furfural. In addition to forming the dispersion in the pump 55 some of the cyclohexane will be dissolved in or extracted by the furfural so that the material passing through pipe 54 will be actually a solution of cyclohexane in furfural and droplets of normal heptane still containing some cyclohexane in solution. By the time the hydrocarbon droplets reach the upper section of the vessel 41 these droplets are pretty well stripped of their cyclohexane content. Since at points higher in vessel 41 these droplets are contacted by furfural leaner in hydrocarbon, by the time the droplets reach the inlets 59 the hydrocarbon is treated by substantially pure extractant. Hydrocarbon which escapes solution in the extractant rises to the top of the vessel 41 as a hydrocarbon phase 52. This phase is ordinarily termed raffinate. This raffinate in this particular example comprises normal heptane with some furfural in solution and is withdrawn from the vessel through line 46 to a recovery unit, such as a distillation column and not shown, for separation of the hydrocarbon from the furfural. If desired, any furfural contained in this raffinate phase may be separated therefrom and recycled into the operation.

When furfural containing some cyclohexane in solution is withdrawn from section 43 through line 47 and is admixed with charge stock in pump 55, the resulting dispersion is passed through line 54 into the mid-portion of section 43. At this point the dispersion which contains the extractant as a continuous phase is diluted with respect to hydrocarbon so that the very fine droplets of hydrocarbon are scattered throughout this portion of the column for intimate contacting with the extractant. These hydrocarbon droplets then flow upward as mentioned above. The upward flowing of these hydrocarbon droplets and the downward flowing of the extractant liquid gives a true liquid-liquid countercurrent operation.

The material flowing through pipe 50 is actually an extract phase which consists of extractant liquid (furfural and water) containing some cyclohexane and n-heptane in solution. This material is then introduced through outlets 70 into the upper portion of the furfural phase 67 in section 42. The material leaving the enlarged section 44 through line 61 will be the extract phase of the process and this phase is then distilled in column 71 for separation of the extractant from the cyclohexane. The cyclohexane hydrocarbon passes overhead as vapor through line 73 and condenses in condenser 74. A portion of this cyclohexane condensate entering line 75A is passed through line 78 as plant product for such disposal as desired. The remaining portion of the cyclohexane is passed on through line 75 into pipe 63. The cyclohexane so recycled through lines 75 and 63 is mixed with furfural containing cyclohexane in solution from pipe 62 in the centrifugal pump 64. The admixture issuing from this pump is conducted through pipe 65 into the enlarged section 44 and consists of droplets of hydrocarbon, mainly cyclohexane, dispersed in furfural containing cyclohexane in solution. This latter solution is the continuous phase and upon entrance of this dispersion from pipe 65 into the section 44 the hydrocarbon droplets are separated by increasing the amount of the continuous phase in their immediate vicinity by dilution with the large amount of extract phase in this section of the vessel. The hydrocarbon of high cyclohexane content so added to this section of the vessel 42 is intended to act as a reflux and to remove from the extract phase the less soluble hydrocarbon material contained therein and such less soluble material will be, in this example, normal heptane. Since the concentration of cyclohexane in this section of the column is relatively high, any normal heptane which is separated will ordinarily contain some cyclohexane in solution. As droplets of this material rise upward in the column 42, they are washed by the downflowing extract phase of progressively lesser concentration of cyclohexane. These hydrocarbon droplets upon reaching the top of section 42 form a hydrocarbon phase 68. Reference numeral 67 is intended to identify the extract phase in section 42 of the column, while reference numeral 69 is intended to identify the interface between the upper hydrocarbon layer 68 and the lower extract layer 67. This hydrocarbon layer 68 is removed through line 49 and it is added to the feed stock from line 48 and the recycle material from line 47 and a mixture of these three components enters pump 55 for mixing. The mixture issuing from pump 55 is transmitted through pipe 54 into the section 43 of the vessel 41. The hydrocarbon layer 68 will contain less cyclohexane and more normal heptane than the overhead product of the still 71. The composition of the hydrocarbon material may be more or less similar to that of the original feed stock entering through line 48. In any event, this hydrocarbon material passing through line 49 will contain an appreciable proportion of normal heptane and should be added to the feed stock for recycling to the process.

If so desired, some of the extract phase passing through line 61 may be by-passed from the distillation column 71 and recycled as reflux into line 63 from line 60 on the suction side of the pump 64 in place of the extract phase containing droplets of hydrocarbon in suspension removed through line 62 for pump mixing as reflux. In like manner, in the upper portion of the apparatus of Figure 2, some of the extract phase passing through line 50 may be by-passed therefrom and passed into the feed line 48 for mixing with the feed and with the hydrocarbon from line 49 into the pump 55 in place of the partial extract phase containing droplets of hydrocarbon in suspension flowing through line 47.

The data given in Tables I and II were taken on the two columns hereinbefore mentioned with the recycle extract phase being taken from the extract phase from a line corresponding to line 17 of Figure 1 in place of the partial extract phase containing hydrocarbon droplets in suspension removed through outlets corresponding to outlets 15. While operation in the manner illustrated by the data is highly satisfactory, operation by recycling partial extract phases with the feed stock and with the reflux material is to be preferred.

The apparatus and materials of construction may be, for the most part, selected from among those commercially available taking into account corrosive properties of any of the materials in the process. Apparatus parts should be constructed of sufficiently heavy materials to withstand any pressures necessary for carrying out the process. Such auxiliary apparatus as valves, pressure and temperature indicating and/or recording devices, etc., are not shown for purposes of simplicity. The installation and use of such auxiliary equipment is understood by those skilled in the art.

The above-described flow systems are given for illustrative purposes and should not be regarded as limiting the invention, the scope of which is set forth by the following claims.

I claim:

1. In a continuous countercurrent liquid-liquid extraction system, a method of improving the efficiency of the liquid-liquid extraction operation comprising maintaining a body of a continuous liquid phase of extractant containing extracted constituents in a liquid-liquid contacting zone, introducing extractant liquid into said continuous phase in said zone at a point near one end, removing continuous liquid phase from the other end of said zone as one product of the process, removing unextracted material from said one end of said zone as a second product of the process, removing continuous liquid phase comprising extracted constituents in solution and containing some unextracted constituents as a disperse liquid phase from said zone at a point near but at a spaced distance from said other end, admixing a feed stock containing extractable material and nonextractable material with the liquid phase comprising extracted constituents in solution and containing some unextracted constituents as a disperse phase removed from said zone at said point near but at a spaced distance from said other end to form a further dispersion of said feed stock in said removed liquid phase containing dispersed liquid, introducing this feed stock dispersion in said liquid phase into said zone at a point intermediate said other end and the point of removal of said liquid phase near but at a spaced distance from said other end.

2. The method of claim 1 wherein the extractant liquid is specifically heavier than the feed stock and said one end of said zone is its top.

3. The method of claim 1 wherein the extractant liquid is specifically lighter than the feed stock and said one end of said zone is its bottom.

4. The method of claim 1 wherein the extractant liquid comprises furfural and the feed stock comprises hydrocarbons.

5. The method of claim 4 wherein the ratio of the volumes of the hydrocarbon feed admixed with the extractant liquid removed from said zone at a point near but at a spaced distance from said other end is maintained between the limits of 1:3 to 1:5.

6. The method of claim 4 wherein the hydrocarbon feed comprises cyclohexane and normal heptane.

7. A continuous countercurrent solvent extraction operation comprising maintaining a first body of extractant liquid containing extracted constituents in a first liquid-liquid contacting zone, introducing extractant liquid into said zone at a point near one end, removing some extractant liquid containing extracted constituents from the other end of said first zone, removing unextracted material containing some extractant liquid in solution from said one end of said zone as one product of the process, removing additional extractant liquid containing extracted constituents and undissolved constituents from said zone at a point near but at a spaced distance from said other end and forming therewith a dispersion of a liquid subsequently produced and a feed stock comprising extractable material and unextractable material, introducing said additional extractant liquid and dispersed material into said first zone at a point intermediate said other end and the point of removal of said additional extractant liquid, maintaining a second body of extractant liquid containing extracted constituents in a second zone, introducing said some extractant liquid from said first zone into said second body of extractant liquid in said second zone, maintaining a body of liquid comprising unextracted constituents of the feed stock above said second body of extractant in said second zone, withdrawing liquid comprising unextracted constituents of the feed stock from said second zone as said liquid subsequently produced, removing a first extractant liquid containing extracted constituents from the other end of said second zone, recovering the extracted constituents and extractant separately from this latter removed liquid, dividing the recovered extracted constituents into two portions, removing one portion as a second product of the process, removing a second extractant liquid containing extract material and unextracted liquid material from said second zone at a point near but at a spaced distance from said other end, admixing with the removed second extractant liquid the other portion of the recovered extracted constituents to form a further liquid-liquid dispersion of said other portion of the recovered extracted constituents in extractant and introducing this latter further dispersion into said second body of extractant liquid at a point of said second zone between said other end and the point of removal of said second extractant liquid near but at a spaced distance from said other end to reflux said operation.

8. The operation of claim 7 wherein the entire recovered extracted constituents are removed as product and an extraneous material is admixed with the removed second extractant liquid from said second zone as said liquid-liquid dispersion.

9. The operation of claim 7 wherein said extractant liquid is specifically heavier than the feed material, said point near said one end of said first zone is near the top end thereof, and said point near said one end of said second zone is near the top end thereof.

10. The method of claim 7 wherein the extractant liquid comprises furfural and the feed stock comprises hydrocarbons.

References Cited in the file of this patent

UNITED STATES PATENTS

| Number | Name | Date |
|---|---|---|
| 2,031,205 | Bray | Feb. 18, 1936 |
| 2,054,295 | Merrill | Sept. 15, 1936 |
| 2,139,392 | Tijmstra | Dec. 6, 1938 |
| 2,299,426 | Rosebaugh | Oct. 20, 1942 |
| 2,361,780 | Lewis | Oct. 31, 1944 |